United States Patent [19]

Way et al.

[11] 4,176,958
[45] Dec. 4, 1979

[54] AUTOMATIC LOOP GAIN ADJUSTMENT FOR OPTICAL NULL SPECTROPHOTOMETERS

[75] Inventors: Allan S. Way, Irvine; Taylor A. Reid, Costa Mesa, both of Calif.

[73] Assignee: Beckman Instruments, Inc., Fullerton, Calif.

[21] Appl. No.: 881,082

[22] Filed: Feb. 24, 1978

[51] Int. Cl.² .............................................. G01J 3/42
[52] U.S. Cl. .................................................. 356/321
[58] Field of Search ..................... 356/321, 322, 89, 90

[56] References Cited

U.S. PATENT DOCUMENTS 3,790,283   2/1974   Way et al. ............................ 356/321

*Primary Examiner*—Vincent P. McGraw
*Attorney, Agent, or Firm*—Robert J. Steinmeyer; Robert R. Meads

[57] ABSTRACT

A double beam, optical null spectrophotometer including means for automatically determining system loop gain requirements and setting the gain to the correct value for optimum response under all operating conditions. With the system ready for operation and a sample in the sample beam path, a difference signal is generated as a function of the position of a reference beam attenuator with and without a small unbalancing signal applied to the system loop. This difference signal is compared to a desired difference signal and a loop gain adjustment is made so that the difference signal will equal the desired difference signal, thereby establishing instrument gain for optimum response.

20 Claims, 1 Drawing Figure

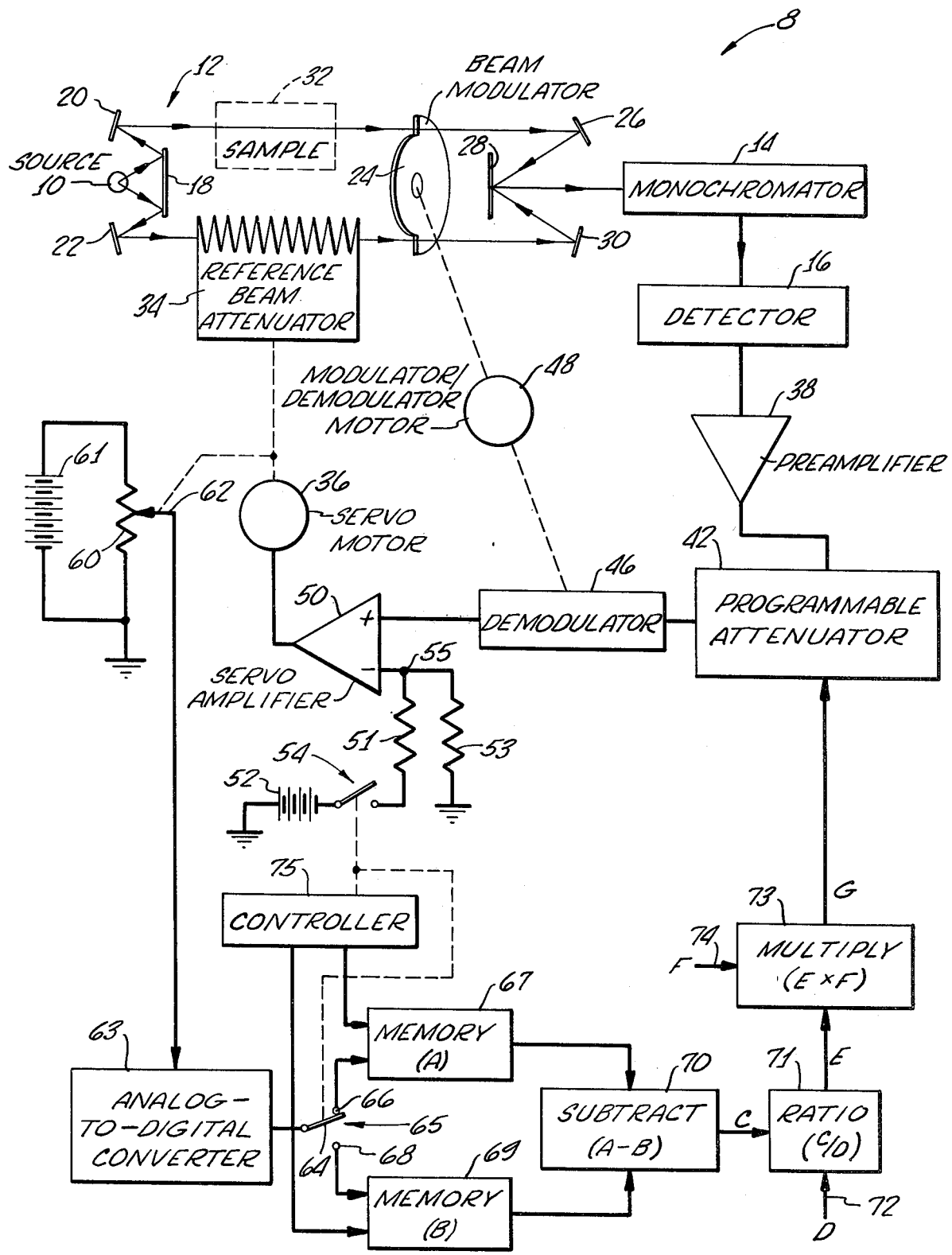

AUTOMATIC LOOP GAIN ADJUSTMENT FOR OPTICAL NULL SPECTROPHOTOMETERS

BACKGROUND OF THE INVENTION

1. Field of the Invention

The present invention relates to a method and apparatus for achieving automatic loop gain adjustment in optical null spectrophotometers and, more particularly, to a method and means for automatically determining system loop gain requirements and setting the gain to the correct value for optimum response in a double beam, optical null spectrophotometer.

2. Description of the Prior Art

In a spectrophotometer of the double beam, optical null type, radiation from a source is split into two beams which are directed along sample and reference paths. The two paths are modulated by a suitable beam modulator which alternatively directs the radiation from the sample path and the radiation from the reference path to a recombining means and then to an electrical error signal generator. A sample to be analyzed is placed in the sample beam path and an attenuator for varying the intensity of the beam in the reference beam path is positioned therein, such attenuator being driven into and out of the reference beam path by a suitable servo motor. The error signal indicative of the difference between the radiation in the reference and sample beam paths is applied to a potentiometer or other means for adjusting the gain thereof. The gain adjusted error signal is coupled to the attenuator servo motor which moves the reference beam attenuator until the error signal is reduced to zero. The position of the reference beam attenuator may then be used to provide a measure of the sample content. Ordinarily, the wavelength of the radiator source is scanned over a range by a monochromator during the measurement to provide a spectrum measure of the sample.

The sensitivity and accuracy of such a spectrophotometer is affected by variations in loop gain of the attenuator servo loop which includes the optical path, the electrical circuitry, and the servo motor. If the loop gain is set too high, oscillation of the attenuator servo motor occurs. If the loop gain is set too low, the response of the servo motor is too slow. For this reason, the before-mentioned gain adjusting means has been included for controlling loop gain.

U.S. Pat. No. 3,790,283 describes one way of simplifying the gain setting operation in a manually controlled spectrophotometer. According to this patent, the reference beam path is closed completely by switching a large unbalancing signal into the amplifier which drives the attenuator servo motor and the gain control is then adjusted to produce a predetermined level of voltage at the input to the amplifier as measured by a DC voltmeter. However, a limitation of this system is that the reference beam attenuator must initially be at the position which is nominally designated as 100% transmission for the reference voltage level to be correct, a condition which is hard to achieve under actual analytical conditions.

Furthermore, the system of this patent requires the gain control to be adjusted to a nominal value for all conditions. While a nominal value of gain can be used for routine work, it is frequently necessary, in normal analysis, to attenuate the reference beam to achieve a desired output on highly absorbing samples or when differential analysis is being performed. In the former case, a beam attenuator in addition to the variable reference beam attenuator is positioned in the reference beam path whereas in the latter case, a reference sample is positioned in the reference beam path in addition to the variable reference beam attenuator. In either case, the amount of energy conducted to the electrical error signal generator is substantially reduced. At these times, it is necessary to increase the system gain to compensate for the losses in the reference beam energy.

In such cases, it has been proposed to utilize a small unbalancing signal to deflect the reference beam attenuator from its balanced position, the amount of deflection being inversely proportional to the system gain. With the unbalancing signal added, the change in the servo motor position is sensed to see whether the servo motor position changes by some predetermined amount indicative of the correct gain setting. If there is a difference between the actual change and the desired change, the loop gain may be manually adjusted and the procedure repeated until the servo motor position change is exactly the predetermined amount indicative of the correct gain setting.

The advantage of this method is that it is usable with a reference beam attenuator in any position where it may be deflected by the nominal amount without contacting the mechanical limits of travel. This method, while suitable for manual adjustment, is time consuming and requires a number of settings and repeated approximations to reach the desired optimum setting when attempting to automate the procedure.

SUMMARY OF THE INVENTION

According to the present invention, there is provided an accurate and repeatable method of establishing loop gain for optimum response in an optical null spectrophotometer. The present analyzer is both accurate and repeatable. The present analyzer does not require a nominal value of gain but permits the automatic determination of system gain requirements regardless of operating conditions. The present invention describes a means for automatically determining system loop gain requirements and setting gain to the correct value with one operation. This greatly simplifies the instrument set-up procedure, especially when an analysis requires reference beam attenuation. This substantially reduces set-up time and increases accuracy.

Briefly, in a double beam, optical null analyzer of the type including a radiation source, means defining reference and sample beam paths, a variable reference beam attenuator positioned in the reference beam path, drive means for positioning the attenuator in the reference beam path, radiation sensing means responsive to the reference and sample beams in the paths for generating an electrical error signal as a function of the difference therebetween, means for adjusting the gain of the error signal, means coupling the gain adjusted error signal to the attenuator drive means, and means selectively coupling an offset signal to the attenuator drive means to deflect the attenuator, there is disclosed an improvement wherein the gain adjusting means is initially set to a predetermined gain setting, an electrical position signal is generated as a function of the position of the attenuator, an electrical difference signal is generated as a function of the difference between the electrical position signal with and without the offset signal coupled to the drive means, an electrical ratio signal is generated as a function of the difference signal divided by a first reference signal indicative of the desired magnitude of the difference signal, the desired magnitude of the difference signal being a function of the offset signal, a revised gain setting signal is generated as a function of the ratio signal multiplied by a second reference signal indicative of the initial gain setting of the gain adjusting means, and the gain adjusting means is set to the value of the revised gain setting signal.

It is therefore an object of the present invention to provide a method and apparatus for achieving automatic loop gain adjustment in optical null spectrophotometers.

It is a further object of the present invention to provide a method and means for automatically determining system loop gain requirements and setting the gain to the correct value for optimum response in an optical null spectrophotometer.

It is a still further object of the present invention to provide an optical null spectrophotometer having a greatly simplified set-up procedure.

It is another object of the present invention to provide an optical null spectrophotometer in which instrument set-up can be achieved quickly and accurately.

Still other objects, features, and attendant advantages of the present invention will become apparent to those skilled in the art from a reading of the following detailed description of the preferred embodiment constructed in accordance therewith, taken in conjunction with the accompanying drawing wherein:

BRIEF DESCRIPTION OF THE DRAWING

The sole FIGURE is a block diagram of a spectrophotometer incorporating the automatic loop gain adjustment of the present invention.

DESCRIPTION OF THE PREFERRED EMBODIMENT

Referring now to the drawing, the present spectrophotometer, generally designated 8, includes a radiation source 10, a beam switching system 12, a monochromator 14, and a detector device 16, which may be, for example, a thermocouple. Source 10 may be any suitable device which produces radiation over the spectrum being analyzed. Beam switching system 12 includes a beam splitter 18 which splits the radiation from source 10 into two beams which are intercepted by reflecting mirrors 20 and 22 which redirect the energy along sample and reference paths, respectively. The two parallel paths are modulated by a suitable beam modulator disc 24 which alternately directs the radiation from the sample path and the reference path to monochromator 14. The radiation along the sample path is directed by a reflecting mirror 26 and a beam combiner 28 into monochromator 14 while the radiation along the reference path is directed by a reflecting mirror 30 and beam combiner 28 into monochromator 14. A sample cell 32 (shown in dotted lines) for containing a sample to be analyzed is positioned in the sample beam path. Means for varying the intensity of the beam along the reference path is positioned therein, which means typically includes a comb or reference beam attenuator 34 which is driven into and out of the reference beam path by a servo motor 36.

The output of detector 16 is amplified by a preamplifier 38 to provide a voltage signal which is coupled to a gain adjusting means, here a programmable attenuator 42. The output of attenuator 42 is coupled to a demodulator 46. Demodulator 46 and beam modulator disc 24 are driven simultaneously by a modulator/demodulator motor 48 so that the demodulation process is synchronized with the modulation process. Demodulator 46 provides an error signal at its output which is conducted to one input of a servo amplifier 50 which controls servo motor 36 to thereby drive reference beam attenuator 34 into or out of the reference beam path until such time as the energies along the sample path and the reference path are substantially equal, at which time the error signal goes to zero. A spectrophotometer as just described, except for attenuator 42, may be found in U.S. Pat. No. 3,790,283.

Spectrophotometer 8 also includes a voltage source 52 connected in series with a switch 54 between ground and one end of a resistor 51. A resistor 53 is connected between the other end of resistor 51 and ground. The junction 55 between resistors 51 and 53 is connected as an unbalancing or offset signal to another input of servo amplifier 50. When switch 54 is closed, a small unbalancing signal is applied to amplifier 50 to deflect reference beam attenuator 34 from its balanced position, the amount of deflection being inversely proportional to system gain. It has been known heretofore to adjust the loop gain until the actual deflection of attenuator 34 equals a desired deflection.

According to the present invention, spectrophotometer 8 includes an attenuator position potentiometer 60 connected across a fixed voltage 61, one end of which may be connected to ground. The wiper 62 of potentiometer 60 is mechanically coupled to servo motor 36 and reference beam attenuator 34. In this manner, wiper 62 generates an electrical position signal as a function of the position of attenuator 34. This voltage is applied to the input of an analog-to-digital converter 63, the output of which is connected to the arm 64 of a switch 65. Switch 65 has a first terminal 66 connected to the input of a first memory 67 and a second terminal 68 connected to the input of a second memory 69. The outputs of memories 67 and 69 are applied as the inputs to a subtraction circuit 70, the output of which is connected to a ratio circuit 71 which also receives a reference voltage over a line 72. The output of ratio circuit 71 is connected to a multiplication circuit 73 which also receives a reference voltage over a line 74. The output of multiplication circuit 73 is connected to programmable attenuator 42. A controller 75 is mechanically coupled to switch 54 and arm 64 of switch 65. Controller 75 also controls memories 67 and 69.

In operation, the closing of switch 54 provides an unbalancing or offset signal to servo amplifier 50 which will cause movement of reference beam attenuator 34 in the reference beam path. If the servo loop has the correct gain, the closing of switch 54 should cause deflection of reference beam attenuator 34 by the same amount, regardless of the energy in the reference and sample beam paths. However, this will not normally occur unless programmable attenuator 42 is adjusted for different energy levels.

More specifically, the offset voltage, the voltage at junction 55, is chosen so that the amount of movement of attenuator 34 will be some predetermined amount of the total attenuator travel when the system gain is correct. Assume, for purposes of example, that the offset voltage is chosen so that attenuator 34 moves 8% of its total travel when the system gain is correct. As reference beam attenuator 34 moves, so does wiper 62, generating an electrical signal at the input of converter 63 which is a function of the position of attenuator 34.

Analog-to-digital converter 63 digitizes this position signal for further processing. If, for example, converter 63 is scaled to digitize the position of attenuator 34 to 1 part in 1000 for 0 to 100% of its travel, then the 8% offset will correspond to a change of reading of 80 counts. For purposes of convenience, the polarity of the offset voltage at junction 55 is chosen to deflect attenuator 34 toward lower readings of converter 63 corresponding to lower percentage transmission values.

Without attenuator 42, the loop gain is maximum. Programmable attenuator 42 reduces the gain of the signal between amplifier 38 and demodulator 46. Programmable attenuator 42 can be a multiplying digital-to-analog converter where the signal from preamplifier 38 is multiplied by a given count before application to demodulator 46. Other implementations of a programmable attenuator 42 will be known to those skilled in the art. For purposes of example, the gain is controlled by an eight bit counter so that the gain setting may be resolved to 1 part in 256. Also assume, for purposes of example, that it is determined that the correct response of spectrophotometer 8 is achieved when the gain of attenuator 42 is set to some nominal value, say the number 40, when there is no attenuation of the reference beam path other than reference beam attenuator 34.

Assume, for purposes of example, that some additional attenuation is introduced into both sample and reference beams so that while system balance is maintained, the energy in the sample and reference beams is reduced by one half. If the offset voltage is now applied to amplifier 50 with the gain set to the previously mentioned nominal value of 40, reference beam attenuator 34 will deflect 16% of its full travel instead of the nominal 8%. If, on the other hand, programmable attenuator 42 is adjusted so that the gain is twice its nominal value, or 80, deflection will again be 8% when the offset voltage is switched on. This process is achieved automatically by spectrophotometer 8.

More specifically, with spectrophotometer 8 set up and sample 32 in the sample beam path, attenuator 42 is initially set to the nominal value mentioned previously, say 40. Controller 75 first opens switch 54 and moves arm 64 of switch 65 into contact with terminal 66. After waiting for a sufficient time to allow the system to settle, controller 75 signals memory 67 to store the output of converter 63. This number will be designated "A". Controller 75 now closes switch 54 and moves arm 64 of switch 65 into contact with terminal 68. After waiting for a sufficient time to allow the system to settle, controller 75 signals memory 69 to store the output of converter 63. This number will be designated "B". Subtraction circuit 70 thereafter calculates A−B=C, the difference between the electrical position signal without the unbalancing signal coupled to servo motor 36 and the electrical position signal with the unbalancing signal coupled to servo motor 36. If the gain of attenuator 42 is set correctly, this difference should be 80 counts, corresponding to the selected offset voltage. In any event, the difference signal C is applied to ratio circuit 71 which receives over line 72 a reference voltage "D" indicative of the desired magnitude of the difference signal, in the present case 80. Ratio circuit 71 divides input C by input D and provides the ratio signal "E". The ratio signal E from circuit 71 is applied as one input to multiplication circuit 73 which receives over line 74 a reference voltage "F" indicative of the nominal gain factor originally set into programmable attenuator 42, namely 40. The output of multiplication circuit 73, a voltage signal "G", indicates the desired gain setting of programmable attenuator 42 and this number is used to set attenuator 42.

Using the example given previously where some attenuation is added to both the sample and reference beam paths to reduce the system energy by one half, A−B=160 which corresponds to a 16% deflection of reference beam attenuator 34. With C=160 and D=80, E=2. With E=2 and F=40, G=80 and the gain of attenuator 42 is doubled, to exactly compensate for the decrease in energy in the sample and reference beam paths.

In other words, spectrophotometer 8 solves the simple formula:

$$G=(A-B/D)F.$$

Since F and D are predetermined, all that is required is the measurement of A and B. With spectrophotometer 8 ready for operation, A is measured with switch 54 open and B is measured with switch 54 closed. The two voltages obtained are stored in memories 67 and 69. This procedure is simple and accurate and requires only a single iteration.

The solution of the above equation can be implemented in various ways using either analog or digital circuitry without detracting from the original intent of the present invention. The use of memories, an analog-to-digital converter, and a programmable attenuator is chosen for convenience only. The output of converter 63 could also be applied to a single counter which is incremented when switch 54 is opened and decremented when switch 54 is closed. This would provide the desired difference signal at the output of the single counter.

Analog-to-digital converters, memories, subtraction circuits, ratio circuits, and multiplication circuits are well-known to those skilled in the art. Controller 75 is simply a synchronization circuit for simultaneously operating switches 54 and 65 and synchronizing the operation of memories 67 and 69.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a double beam, optical null analyzer of the type including a radiation source, means defining reference and sample beam paths, a variable reference beam attenuator positioned in said reference beam path, drive means for positioning said attenuator in said reference beam path, radiation sensing means responsive to the reference and sample beams in said paths for generating an electrical error signal as a function of the difference therebetween, means for adjusting the gain of said error signal, means coupling said gain adjusted error signal to said attenuator drive means, and means selectively coupling an offset signal to said attenuator drive means to deflect said attenuator, a method for setting said gain adjusting means comprising the steps of:

setting said gain adjusting means to a predetermined initial gain setting;

generating a signal as a function of the position of said attenuator;

determining the difference between said position signal with said offset signal coupled to said drive means and said position signal without said offset signal coupled to said drive means;

determining the ratio of said determined difference to a reference difference, said reference difference being a function of said offset signal;

detemining the product of said ratio and said initial gain setting; and setting the gain of said gain adjusting means to the value of said product.

2. In a double beam, optical null analyzer according to claim 1, a method wherein said reference difference is the amount said position signal should change when said offset signal is coupled to said drive means if the gain of said gain adjusting means is set to the correct value.

3. In a double beam, optical null analyzer according to claim 2, a method wherein the step of determining the position signal difference comprises the steps of:

sensing the magnitude of said position signal without said offset signal coupled to said drive means;

sensing the magnitude of said position signal with said offset signal coupled to said drive means; and subtracting said sensed magnitudes.

4. In a double beam, optical null analyzer of the type including a radiation source, means defining reference and sample beam paths, a variable reference beam attenuator positioned in said reference beam path, drive means for positioning said attenuator in said reference beam path, radiation sensing means responsive to the reference and sample beams in said paths for generating an electrical error signal as a function of the difference therebetween, means for adjusting the gain of said error signal, means coupling said gain adjusted error signal to said attenuator drive means, and means selectively coupling an offset signal to said attenuator drive means to deflect said attenuator, a method for setting said gain adjusting means comprising the steps of:

setting said gain adjusting means to a predetermined initial gain setting;

generating an electrical position signal as a function of the position of said attenuator;

generating an electrical difference signal as a function of the difference between said electrical position signal with said offset signal coupled to said drive means and said electrical position signal without said offset signal coupled to said drive means;

generating an electrical ratio signal as a function of said difference signal divided by a first reference signal indicative of the desired magnitude of said difference signal, said desired magnitude of said difference signal being a function of said offset signal;

generating a revised gain setting signal as a function of said ratio signal multiplied by a second reference signal indicative of said initial gain setting of said gain adjusting means; and setting the gain of said gain adjusting means to the value of said revised gain setting signal.

5. In a double beam, optical null analyzer according to claim 4, a method wherein said first reference signal equals the amount said position signal should change when said offset signal is coupled to said drive means if the gain of said gain adjusting means is set to the correct value.

6. In a double beam, optical null analyzer according to claim 4, a method wherein the step of generating an electrical difference signal comprises the steps of:

storing the magnitude of said electrical position signal without said offset signal coupled to said drive means;

storing the magnitude of said electrical position signal with said offset signal coupled to said drive means; and subtracting the stored signals.

7. In a double beam, optical null analyzer of the type including a radiation source, means defining reference and sample beam paths, a variable reference beam attenuator positioned in said reference beam path, drive means for positioning said attenuator in said reference beam path, radiation sensing means responsive to the reference and sample beams in said paths for generating an electrical error signal as a function of the difference therebetween, means for adjusting the gain of said error signal, means coupling said gain adjusted error signal to said attenuator drive means, and means selectively coupling an offset signal to said attenuator drive means to deflect said attenuator, the improvement comprising:

means responsive to said drive means for generating a signal as a function of the position of said attenuator;

means for determining the difference between said position signal with said offset signal coupled to said drive means and said position signal without said offset signal coupled to said drive means;

means for determining the ratio of said determined difference to a reference difference, said reference difference being a function of said offset signal; and means for controlling said gain adjusting means as a function of said determined ratio.

8. In a double beam, optical null analyzer according to claim 7, the improvement wherein said reference difference is the amount said position signal should change when said offset signal is coupled to said drive means if the gain of said gain adjusting means is set to the correct value.

9. In a double beam, optical null analyzer according to claim 7, the improvement wherein said gain adjusting means is initially set to a predetermined gain setting and wherein said means for controlling said gain adjusting means comprises:

means for determining the product of said ratio and said initial gain setting, said product being applied to said gain adjusting means to set the gain thereof.

10. In a double beam, optical null analyzer according to claim 9, the improvement wherein said gain adjusting means is set to the value of said product.

11. In a double beam, optical null analyzer according to claim 7, the improvement wherein said position signal generating means comprises:

a potentiometer having a movable arm;

a voltage source connected across said potentiometer; and means for connecting said attenuator drive means to said movable arm of said potentiometer.

12. In a double beam, optical null analyzer according to claim 7, the improvement wherein said difference determining means comprises:

first memory means for storing the magnitude of said position signal without said offset signal coupled to said drive means;

second memory means for storing the magnitude of said position signal with said offset signal coupled to said drive means; and means for subtracting the signals stored in said first and second memory means.

13. In a double beam, optical null analyzer according to claim 12, the improvement wherein said means selectively coupling an offset signal to said attenuator drive means simultaneously controls the coupling of said offset signal to said attenuator drive means and the application of said position signal to said first or said second memory means.

14. In a double beam, optical null analyzer of the type including a radiation source, means defining reference and sample beam paths, a variable reference beam attenuator positioned in said reference beam path, drive means for positioning said attenuator in said reference beam path, radiation sensing means responsive to the reference and sample beams in said paths for generating an electrical error signal as a function of the difference therebetween, means for adjusting the gain of said error signal, means coupling said gain adjusted error signal to said attenuator drive means, and means selectively coupling an offset signal to said attenuator drive means to deflect said attenuator, the improvement comprising:

means responsive to said drive means for generating an electrical position signal as a function of the position of said attenuator;

means responsive to said position signal for generating an electrical difference signal as a function of the difference in said position signal with and without said offset signal coupled to said drive means;

means responsive to said difference signal and a reference signal indicative of the desired magnitude of said difference signal for generating an electrical ratio signal as a function of said difference signal divided by said reference signal, said reference signal being a function of said offset signal; and means responsive to said ratio signal for controlling said gain adjusting means.

15. In a double beam, optical null analyzer according to claim 14, the improvement wherein said reference signal equals the amount said position signal should change when said offset signal is coupled to said drive means if the gain of said gain adjusting means is set to the correct value.

16. In a double beam optical null analyzer according to claim 14, the improvement wherein said gain adjusting means is initially set to a predetermined gain setting and wherein said means for controlling said gain adjusting means comprises:

means responsive to said ratio signal and a second reference signal indicative of said initial gain setting for generating a revised gain setting signal as a function of the product of said ratio signal and said initial gain setting signal, said revised gain setting signal being applied to said gain adjusting means to set the gain thereof.

17. In a double beam, optical null analyzer according to claim 16, the improvement wherein said revised gain setting signal becomes the gain setting for said gain adjusting means.

18. In a double beam, optical null analyzer according to claim 14, the improvement wherein said electrical position signal generating means comprises:

a potentiometer having a movable arm;

a voltage source connected across said potentiometer; and means for connecting said attenuator drive means to said movable arm of said potentiometer.

19. In a double beam, optical null analyzer according to claim 14, the improvement wherein said electrical difference signal generating means comprises:

first memory means for storing the magnitude of said electrical position signal without said offset signal coupled to said drive means;

second memory means for storing the magnitude of said electrical position signal with said offset signal coupled to said drive means; and means responsive to said first and second memory means for subtracting the signals stored therein.

20. In a double beam, optical null analyzer according to claim 19, the improvement wherein said means selectively coupling an offset signal to said attenuator drive means simultaneously controls the coupling of said offset signal to said attenuator drive means and the application of said position signal to said first or second memory means.

* * * * *